J. H. COLE.
Broadcast Seeder.
No. 103,719. Patented May 31, 1870.
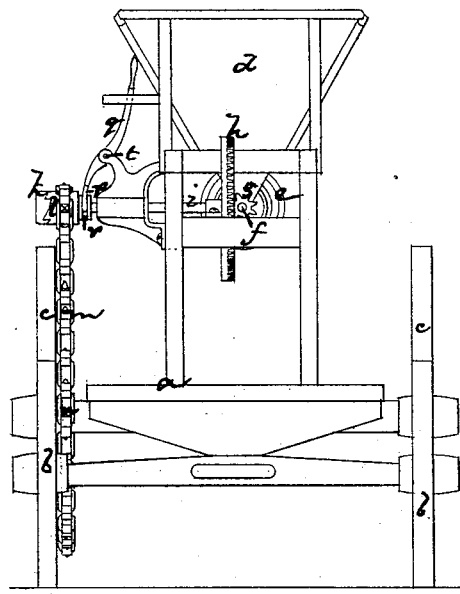
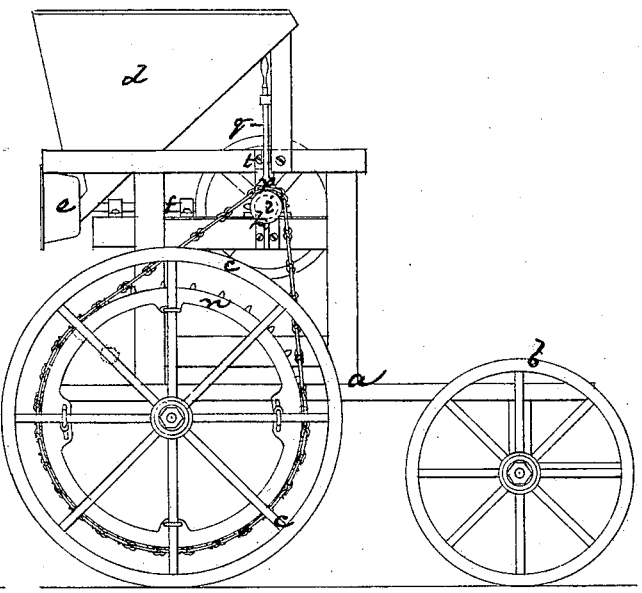
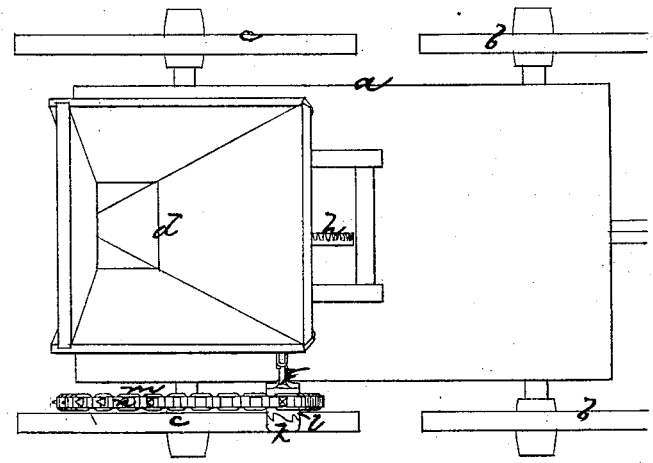

United States Patent Office.

JOHN H. COLE, OF VACAVILLE, CALIFORNIA.

Letters Patent No. 103,719, dated May 31, 1870.

IMPROVEMENT IN WHEEL-CARRIAGE SEED-SOWERS.

The Schedule referred to in these Letters Patent and making part of the same.

*To all whom it may concern:*

Be it known that I, JOHN H. COLE, of Vacaville, in the county of Solano and State of California, have invented an Improvement in Wheel-carriage Seed-Sowers; and I do hereby declare that the following, taken in connection with the drawing which accompanies and forms part of this specification, is a description of my invention sufficient to enable those skilled in the art to practice it.

This invention relates particularly to an improvement in that class of seed sowing machines in which the seed fed from a hopper into a delivery-spout or discharger is thrown or broadcast from the machine by rotation of the said discharger, effected by the movement of the carriage upon which the seeding mechanism is mounted, or of which such mechanism forms a part, the movement of the discharger being directly effected by the movement of the carriage, the discharger being directly or indirectly connected to one of the carriage-wheels by a geared or bolted connection, such a machine being shown, for instance, in C. W. Cahoon's patent of September 1, 1857, reissued may 11, 1858.

In all Cahoon seed-sowers, and others similar in organization or general method of operation, there is a positive connection between the discharger and the driving carriage-wheel, so that the discharger is driven in either direction of movement of the carriage, and cannot be stopped except by throwing off the belt, this, or shutting off the passage of the seed from the hopper, being the only method of preventing the sowing of the seed when the carriage is in motion.

The object of my invention is to so organize the mechanism that, when the carriage backs, the sower will always fail to operate, and when the carriage goes forward the rider upon the machine can instantly disconnect the driving-wheel and rotary-discharger, or connect them, as circumstances may require or render desirable.

My invention consists in this organization.

The drawing represents a Cahoon seed-sowing machine embodying my improvement.

A denotes a side elevation of the machine.
B is an end elevation thereof.
C, a plan.

$a$ denotes the frame-work of the carriage, mounted upon wheels $b$ $c$, and having mounted upon it the hopper $d$.

This hopper is stationary relatively to the frame $a$, and opens at bottom into the discharger $e$.

The mouth of the discharger is fixed on the end of a rotary horizontal shaft, $f$, its rear or delivery mouth being in a vertical plane.

The shaft rotates in suitable bearings on the framework, and has at its front end a pinion, $g$, meshing into and driven by a gear-wheel, $h$, on the inner end of a cross-shaft, $i$, at whose outer end is a clutch, $k$, that engages with a sliding sprocket-pulley, $l$, sliding over the shaft, and rotating loosely on the shaft when not in engagement with the clutch $k$, and rotating with said shaft when in engagement with the clutch.

This sprocket-pulley is connected by a sprocket-chain or belt, $m$, with a sprocket-wheel, $n$, on one side of one of the wheels $o$, as seen in the drawing, so that rotation of the driving-wheel $c$, or movement of the carriage, always effects rotation of the sprocket-pulley $l$.

The clutch-teeth are so formed that they unclutch when the pulley $l$ is turned by the rear movement of the carriage, so that no movement is then imparted to the rotary seed-discharger, while, if the pulley $l$ be pressed against the clutch $k$, when the carriage is drawn forward the pulley will rotate the clutch and the discharger geared to the clutch-shaft.

A fork, $p$, at the end of a hand clutch-lever, enters a groove, $r$, around the pulley $s$, the lever being fulcrumed at $t$, and its handle being located in convenient position to be grasped by the rider.

It will thus be seen that, without throwing off any belt or leaving the carriage, the driver or operator can instantly throw the discharger into or out of rotative operation, as circumstances may require, as in "turning," going to and from the grounds to be sowed, and when passing over grounds or pieces of ground not to be sowed.

I claim, in combination with the seed-discharger $e$, or its equivalent, and its driving mechanism, operated by the movement of the carriage, the intermediate clutch and clutch-pulley operating to automatically throw the discharger out of action when the carriage backs, substantially as described.

J. H. COLE.

Witnesses:
D. K. CORN,
JAS. EVERSOLE.